(12) United States Patent
Kitajima

(10) Patent No.: US 7,051,967 B2
(45) Date of Patent: May 30, 2006

(54) REEL UNIT FOR SPINNING REEL

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 86 days.

(21) Appl. No.: 10/456,678

(22) Filed: Jun. 9, 2003

(65) Prior Publication Data

US 2004/0021023 A1    Feb. 5, 2004

(30) Foreign Application Priority Data

Jul. 31, 2002    (JP)    .............................. 2002-223037

(51) Int. Cl.
   *A01K 89/00*   (2006.01)
   *A01K 89/01*   (2006.01)

(52) U.S. Cl. ................. 242/316; 242/311; 242/323

(58) Field of Classification Search ................ 242/229, 242/316, 323, 310, 311; 322/140, 141; 43/20, 43/22; 16/421, 440, 111.1
See application file for complete search history.

(56) References Cited

U.S. PATENT DOCUMENTS

| | | | | |
|---|---|---|---|---|
| 412,479 | A | * | 10/1889 | Davis ...................... 264/271.1 |
| 1,860,596 | A | * | 5/1932 | Reinold ...................... 220/753 |
| 2,799,457 | A | * | 7/1957 | Martini ...................... 242/282 |
| 4,019,693 | A | * | 4/1977 | Lesage ...................... 242/229 |
| 4,289,283 | A | * | 9/1981 | Morimoto ...................... 242/316 |
| 4,830,306 | A | * | 5/1989 | Tsunoda et al. ............ 242/316 |
| 5,470,754 | A | | 11/1995 | Rounbehler et al. ........ 436/106 |
| 5,797,554 | A | * | 8/1998 | Atherton et al. ............ 242/316 |
| 6,614,242 | B1 | | 9/2003 | Matter et al. ................ 324/698 |
| 6,629,655 | B1 | * | 10/2003 | Kitajima ...................... 242/311 |
| 6,655,622 | B1 | * | 12/2003 | Kitajima et al. ............ 242/322 |
| 2003/0146324 | A1 | * | 8/2003 | Yeh .............................. 242/311 |
| 2003/0146325 | A1 | * | 8/2003 | Kitajima ...................... 242/311 |
| 2004/0079821 | A1 | * | 4/2004 | Kitajima ...................... 242/311 |
| 2005/0051652 | A1 | * | 3/2005 | Myojo et al. ................ 242/311 |

FOREIGN PATENT DOCUMENTS

| | | |
|---|---|---|
| EP | 1106062 A1 | 6/2001 |
| JP | 11-346610 A | 12/1999 |
| JP | 11346610 A | 12/1999 |

\* cited by examiner

*Primary Examiner*—Kathy Matecki
*Assistant Examiner*—Evan Langdon
(74) *Attorney, Agent, or Firm*—Shinjyu Global IP Counselors, LLP

(57) ABSTRACT

A reel unit for a spinning reel includes a reel body, a rod attachment leg that is formed integrally with the reel body, and a reinforcing member that is coupled to the reel body by being mounted opening. The rod attachment leg has an accommodation space that opens longitudinally along the length thereof, and the reinforcing member is mounted in this accommodation space. The reinforcing member is a metal member. A portion of the reinforcing member protrudes from the outer peripheral surfaces of the rod attachment leg. A through hole is formed in the lower portion of the reinforcing member, and a screw is inserted into the through hole to be screwed fast to the reel body. In this manner, the strength of a rod attachment leg on a reel unit of a spinning reel can be increased with an inexpensive structure.

20 Claims, 6 Drawing Sheets

REEL UNIT FOR SPINNING REEL

BACKGROUND OF THE INVENTION

1. Field of the Invention

This invention generally relates to a reel unit. More specifically, the present invention relates to a reel unit for a spinning reel.

2. Background Information

A spinning reel generally includes a reel unit having a handle, a spool that is mounted on the reel unit so as to be front and rear and on the outer periphery of which fishing line is wound, a rotor supported on the reel unit so as to be freely rotatable thereon and which serves to wind fishing line around the spool, and a rotor drive mechanism that transmits the rotation of the handle to the rotor. The reel unit is formed from a single synthetic resin or metal, and includes a reel body and a T-shaped rod attachment leg which extends diagonally upward from the reel body so as to be integral therewith.

With this type of spinning reel, it is well known to insert-mold a core in the rod attachment leg due to the fact that a great deal of force (torque) is applied to the rod attachment leg when the fishing line is wound up. An example of this is shown in Japanese Unexamined Patent Application H11-346610.

In conventional spinning reels, the strength of the rod attachment leg can be increased and maintained because a core is insert-molded in the rod attachment leg. However, because the process of insert-molding the core in the rod attachment leg is complex, there are concerns that the formation of the rod attachment leg is too problematic and that manufacturing costs will increase.

In view of the above, there exists a need for reel unit which overcomes the above mentioned problems in the prior art. This invention addresses this need in the prior art as well as other needs, which will become apparent to those skilled in the art from this disclosure.

SUMMARY OF THE INVENTION

It is a purpose of the present invention to easily increase and maintain the strength of a rod attachment leg on a reel unit of a spinning reel with an inexpensive structure.

A reel unit for a spinning reel according to the first aspect of the invention comprises a reel body in which various mechanisms are mounted therein, a T-shaped rod attachment leg portion which extends upward from the reel body and integral therewith and which has an accommodation space that opens to the exterior thereof, and a reinforcing member that is mounted in the accommodation space from the opening.

In this reel unit, the accommodation space is formed to open to the exterior of the reel body, and the reinforcing member is mounted in the accommodation space from the opening therein. Compared to situations in which a core is insert molded in the rod attachment leg, the strength of the rod attachment leg can be easily increased and maintained with an inexpensive structure because a reinforcing member can be mounted in the accommodation space from the opening after the process which forms the rod attachment leg.

The reel unit according to the second aspect of the invention is the reel unit of the first aspect, in which the rod attachment leg portion is formed from a synthetic resin. In this situation, the rod attachment leg portion is a portion that will come into direct contact with one's hand, and will have an excellent tactile sensation because it is formed from a synthetic resin.

The reel unit according to the third aspect of the invention is the reel unit of the first or the second aspect, in which the reinforcing member is formed from a metal. In this situation, the reinforcing effect will be outstanding.

The reel unit according to the fourth aspect of the invention is the reel unit of the first or the second aspect, in which the reinforcing member is formed from a synthetic resin. In this situation, the reinforcing member can be lightened.

The reel unit according to the fifth aspect of the invention is the reel unit of any one of claims first through fourth aspects, in which an opening is formed in at least a front side or a rear side of the rod attachment leg portion. In this situation, the rod attachment leg portion can be reinforced particularly with respect to torque by, for example, mounting the reinforcing member from a slit shaped opening formed in the rod attachment leg in the longitudinal direction.

The reel unit according to the sixth aspect of the invention is the reel unit of any one of first through fifth aspects, in which the reinforcing member is mounted in the accommodation space such that a portion thereof protrudes out therefrom. In this situation, it will be difficult to increase the thickness of the overall rod attachment leg portion because a portion of the reinforcing member is made to protrude out from the peripheral surface thereof.

The reel unit according to the seventh aspect of the invention is the reel unit of any one of the first through sixth aspects, in which openings are formed at a plurality of positions on the rod attachment leg, and a plurality of reinforcing members are mounted in the accommodation space from the plurality of openings. In this situation, the strength of the rod attachment leg can be further increased and maintained by means of a plurality of reinforcing members.

The reel unit according to the eighth aspect is the reel unit of any one of the first through seventh aspects, in which the reinforcing member is detachably mounted in the accommodation space. In this situation, the reinforcing member is easily replaced because it can be attached to the rod attachment leg and detached therefrom by means of a screw.

The reel unit according to the ninth aspect of the invention is the reel unit of the eighth aspect, in which the reel body further comprises a body member in which various mechanisms are mounted therein, and a lid member that is screwed to the body member together with the reinforcing member. In this situation, the number of parts can be reduced by having the screw for the lid member also serve as the screw for the reinforcing member.

The reel unit according to the tenth aspect of the invention is the reel unit of the ninth aspect, in which the rod attachment leg portion is formed integral with the body member. In this situation, the structure of the lid member is simplified because the rod attachment leg and the body member are formed integral with each other.

The reel unit according to the eleventh aspect of the invention is the reel unit of the ninth aspect, in which the rod attachment leg portion is formed integral with the lid member. In this situation, the rod attachment leg portion and the lid member are integral, and the commingling of the thick portions and thin portions thereof is reduced so that the body member is made thin to increase and maintain the precision thereof, and the rod attachment leg portion is made thick to maintain the strength thereof.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
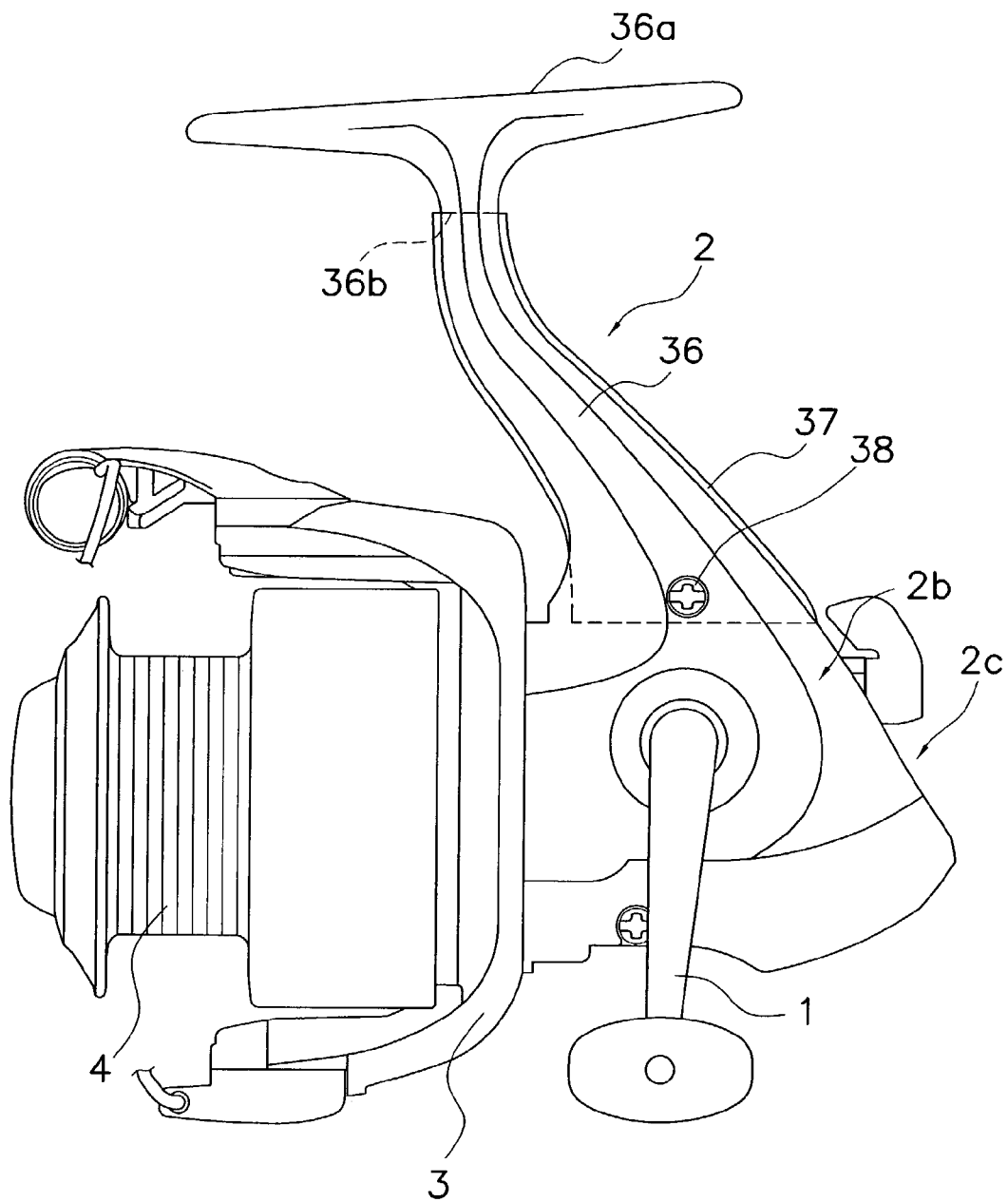
FIG. 1 is a lateral view of a spinning reel according to an embodiment of the present invention.
Figure 2:
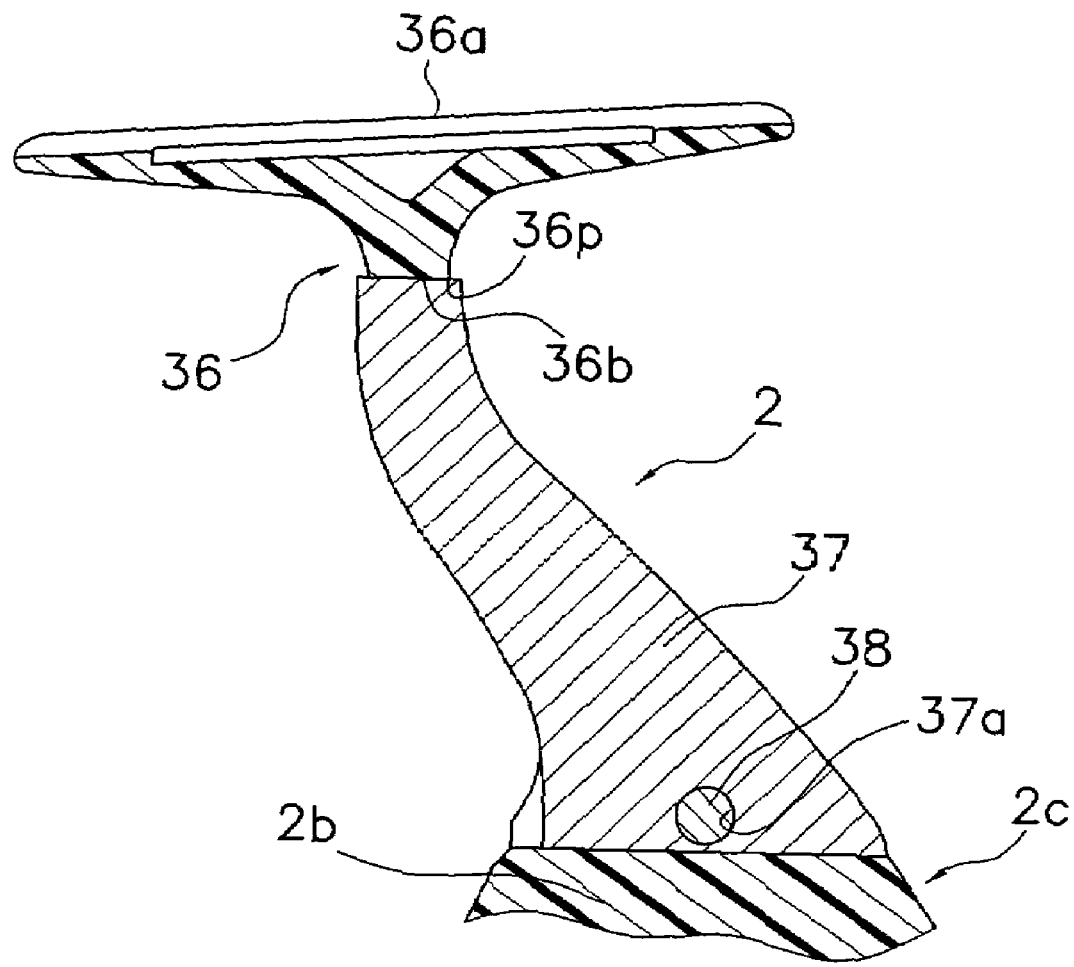
FIG. 2 is a partial cross-sectional view of an attachment leg according to the embodiment of the present invention, as viewed along the arrow II shown in FIG. 3.

As shown in FIGS. 1 and 2, a spinning reel in accordance with an embodiment of the present invention includes a reel unit 2 rotatably supporting a freely rotatable handle 1 and mounted to a fishing rod, a rotor 3, and a spool 4. The rotor 3 serves to wind a fishing line around the spool 4, and is supported on the front of the reel unit 2 such that it is freely rotatable. The spool 4 is disposed on the front of the rotor 3 and can freely move forward and backward so that fishing line is wound around the outer peripheral surface thereof by the rotor 3. It should be noted that the handle 1 can be mounted to the left side of the reel unit 2 as shown in FIG. 1, or to the right side of the reel unit 2 as shown in FIG. 2.

Figure 3:
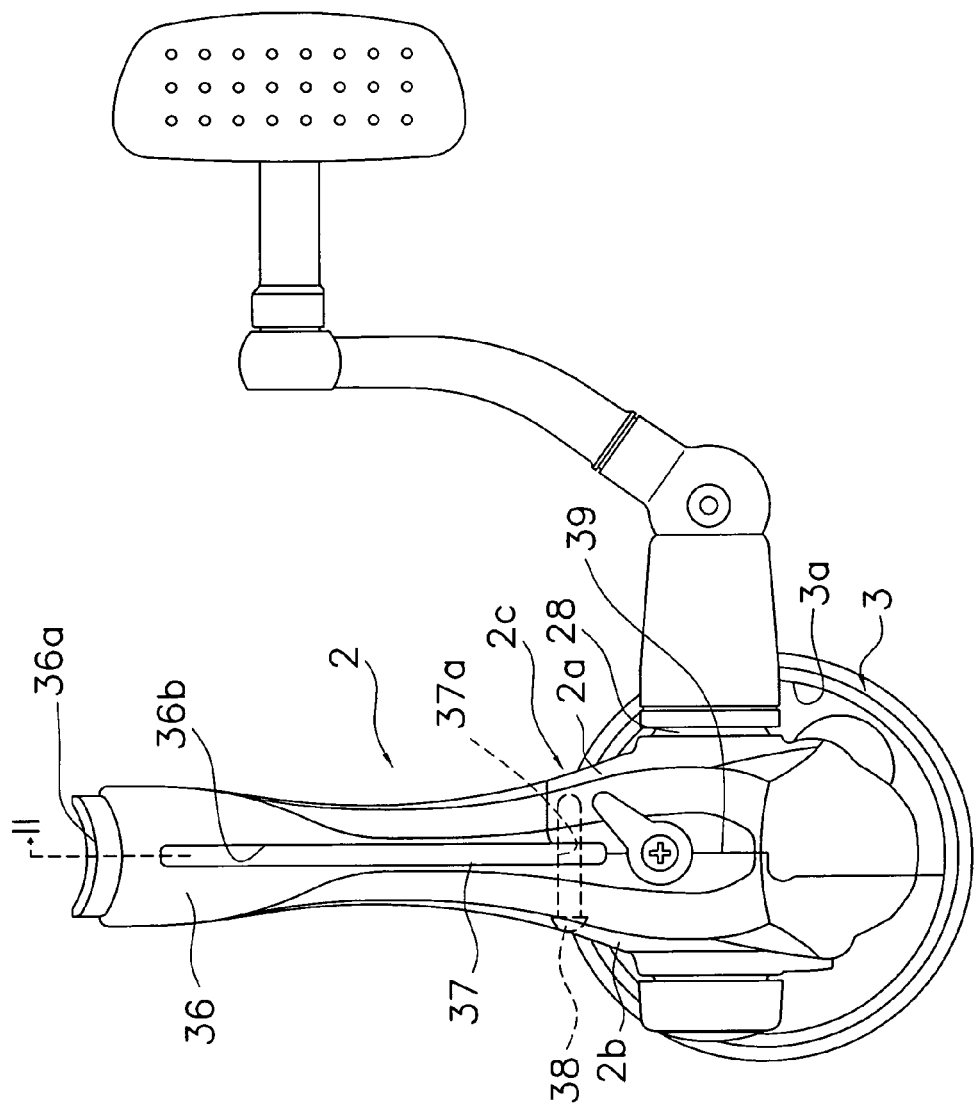
FIG. 3 is a bottom view of the spinning reel according to the embodiment of the present invention.

As shown in FIGS. 1 and 3, the reel unit 2 includes a reel body 2c that has a casing 2a that supports the rotor 3 and the spool 4, and a lid portion 2b that is detachably screwed to the casing 2a. The reel unit 2 further includes a rod attachment leg 36, which extends diagonally upward from the reel body 2c.

As shown in FIGS. 1 and 3, the casing 2a is formed of a synthetic resin and is produced by injection molding. As shown in FIG. 3, the casing 2a has a space which can accommodate various mechanisms therein, and a handle support portion 28 on which the handle 1 can be mounted.

As shown in FIGS. 1 and 3, the lid portion 2b is made of a synthetic resin and is produced by injection molding. As shown in FIG. 3, the lid portion 2b has a handle support portion 28 on which the handle 1 can be mounted.

The rod attachment leg 36 is formed integrally with the lid portion 2b, and is a T-shaped member that extends diagonally upward from the lid portion 2b. As shown in FIG. 2, the rod attachment leg 36 is a solid and thick-walled member, one end of which extends longitudinally to form an attachment portion 36a. The rod attachment leg 36 has an accommodation space 36b (an example of accommodation hole) having a slit-shaped opening 36p that opens longitudinally along the length thereof, and a reinforcing member 37 is mounted in this accommodation space 36b.

The reinforcing member 37 is a metal member that is mounted such that a portion thereof protrudes from the outer peripheral surfaces of the rod attachment leg 36. A through hole 37a is formed in the lower portion of the reinforcing member 37, and a screw 38 is inserted into the through hole 37a and the lid portion 2b and screwed fast to the casing 2a. In this manner, the reinforcing member 37 is fixedly coupled to the casing 2a. The reinforcing member 37 and the screw 38 are conventional components well known in the art. Therefore, the structure of the reinforcing member 37 and the screw 38 will not be discussed or illustrated in detail herein. Also, the reinforcing member 37 can be fixedly coupled to the casing 2a by any other means other than a screw.

In a spinning reel constructed in this manner, the accommodation space 36b is formed to be open to the exterior of the rod attachment leg 36, and the reinforcing member 37 is mounted in the accommodation space 36b from the opening therein. After attaching the lid portion 2b to the casing 2a, the reinforcing member 37 can be mounted in the accommodation space 36b from the opening in the rod attachment leg 36. Thus, compared to situations in which a core is insert-molded in the rod attachment leg 36, the strength of the rod attachment leg 36 can be easily increased and maintained with an inexpensive structure.

OTHER EMBODIMENTS (a) The type of spinning reels to which the present invention can be applied is not limited to the aforementioned embodiment. The present invention can be suitably applied to spinning reels having a drag mechanism or a control mechanism that has a brake lever instead of a reverse rotation prevention mechanism.

(b) Although the reinforcing member 37 is formed from metal in the aforementioned embodiment, it may also be formed from a synthetic resin. For example, the reinforcing member 37 may be formed from a synthetic resin that is strengthened with fibers such as glass fibers, carbon fibers, boron, or the like, or a thermoset resin such as an epoxy resin. In addition, although the rod attachment leg 36 is formed from a synthetic resin, it may be formed from a metal.

(c) Although the rod attachment leg 36 in the aforementioned embodiment is formed integrally with the lid portion 2b, the rod attachment leg 36 may instead be formed integrally with the casing 2a.

Figure 4:
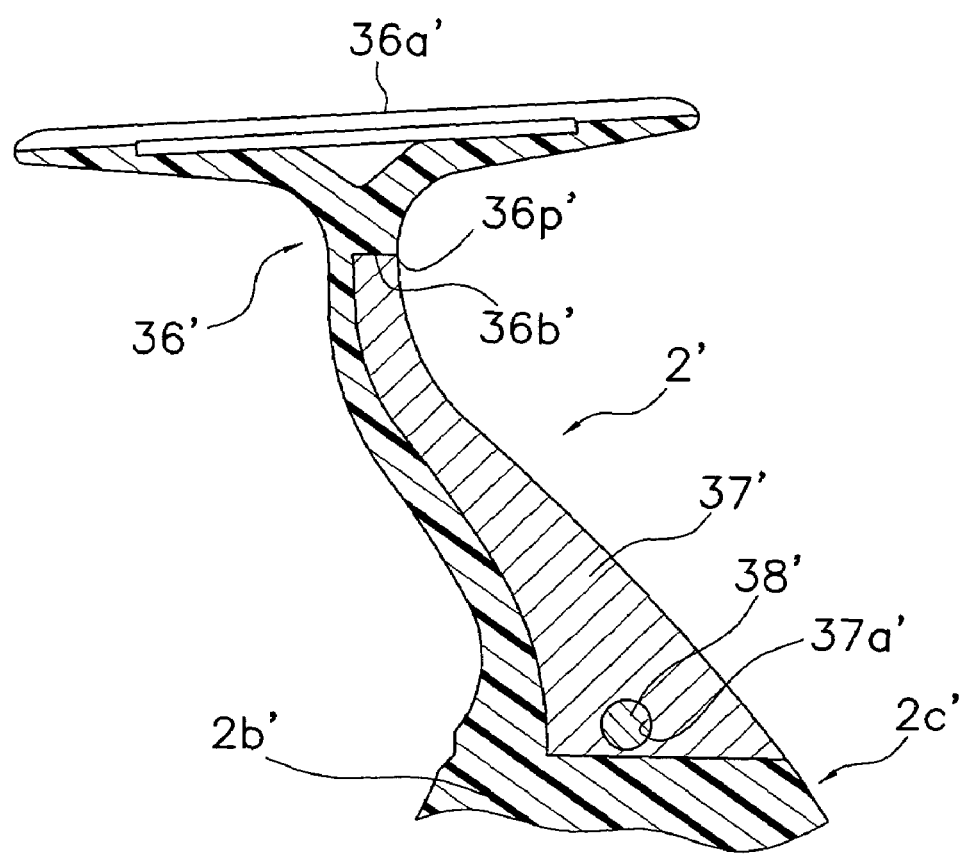
FIG. 4 is a partial cross-sectional view of an attachment leg according to another embodiment of the present invention, as viewed along the arrow II shown in FIG. 3.

(d) Although the rod attachment leg 36 in the present embodiment is provided with the accommodation space 36b that opens longitudinally along the length thereof, the accommodation space 36b' may, for example, be open only along the rear side thereof as shown in FIG. 4.

(e) Although the reinforcing member 37 in the aforementioned embodiments is mounted so that a portion thereof protrudes from the outer peripheral surface of the rod attachment leg 36, it may instead be mounted so that it is flush with the outer peripheral surface of the rod attachment leg 36' as shown in FIG. 4.

Figure 5:
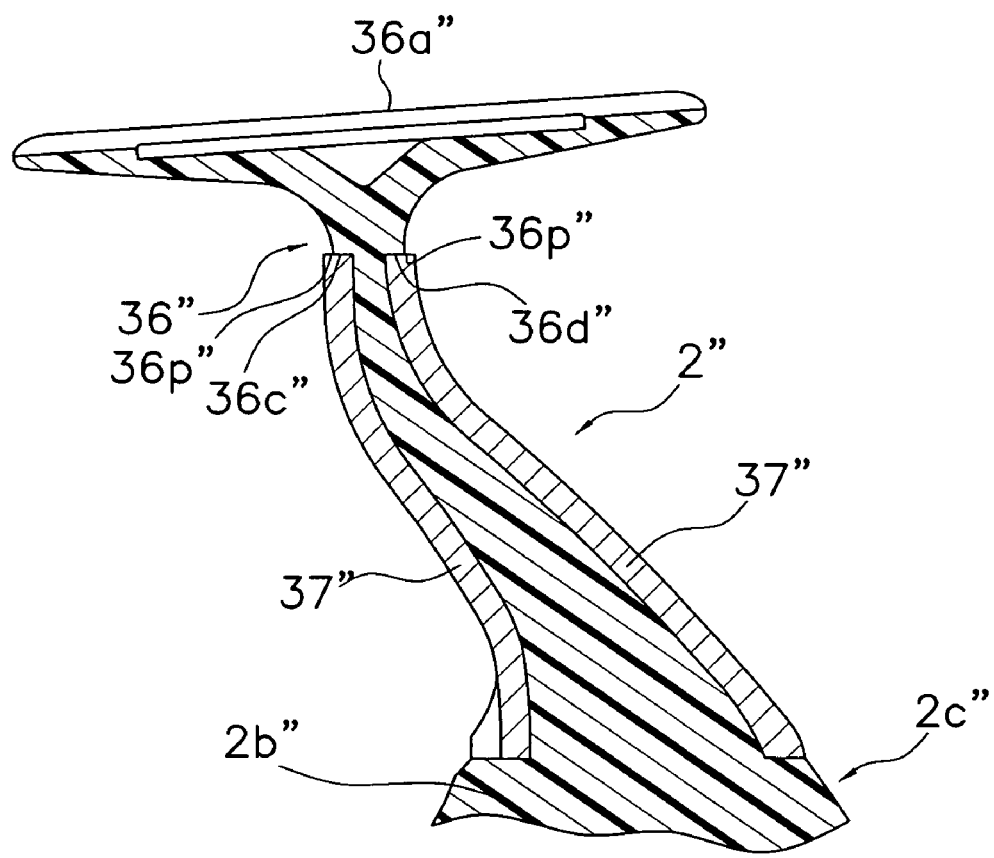
FIG. 5 is a partial cross-sectional view of an attachment leg according to still another embodiment of the present invention, as viewed along the arrow II shown in FIG. 3.
Figure 6:
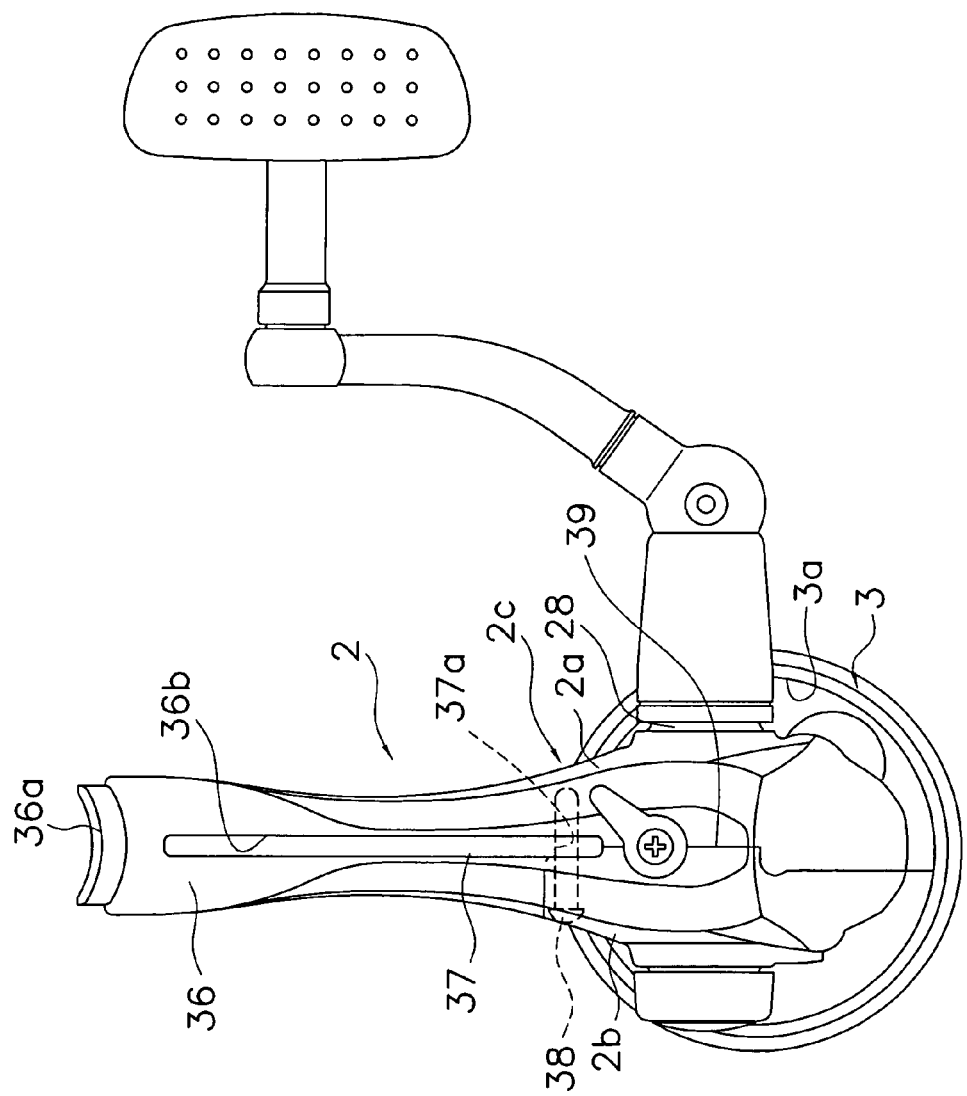
FIG. 6 is a bottom view of the spinning reel according to still another embodiment of the present invention.

(f) Although a single reinforcing member 37 is mounted in the aforementioned embodiment, as shown in FIG. 5, a plurality of reinforcing members 37" may be mounted in a plurality of accommodation spaces 36c''', 36d''' that open longitudinally along the length of the rod attachment leg 36'''.

Furthermore, the shapes of the reinforcing members and the accommodation spaces are not limited to those shown in the forgoing embodiments.

According to the present invention, the strength of a rod attachment leg on a reel unit of a spinning reel can be easily increased and maintained with an inexpensive structure by forming an accommodation space therein that opens to the exterior of the rod attachment leg, and mounting a reinforcing member in the accommodation space from the opening.

As used herein, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-223037. The entire disclosure of Japanese Patent Application No. 2002-223037 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A reel unit for a spinning reel that includes a spool and is adapted to be attached to a fishing rod and wind out fishing line, comprising:
   a reel body, said reel body having a front, a side and a rear portion, wherein the spool is adapted to be on the front side;
   a T-shaped rod attachment leg portion which extends upward from said reel body, said rod attachment leg portion being formed integrally with a portion of said reel body, and having therein an accommodation hole having a slit-shaped opening that is open to an exterior at least on a rear side of said rod attachment leg portion and closed to exterior side surfaces of said rod attachment leg portion; and
   a reinforcing member that is coupled to said reel unit by being inserted in said accommodation hole through said opening.

2. The reel unit for a spinning reel set forth in claim 1, wherein
   said rod attachment leg portion is formed from a synthetic resin.

3. The reel unit for a spinning reel set forth in claim 1, wherein
   said reinforcing member is formed from a metal.

4. The reel unit for a spinning reel set forth in claim 1, wherein
   said reinforcing member is formed from a synthetic resin.

5. The reel unit for a spinning reel set forth in claim 1, wherein
   said accommodation hole also opens to a front side of said rod attachment leg portion.

6. The reel unit for a spinning reel set forth in claim 1, wherein
   a portion of said reinforcing member protrudes out from said rod attachment leg portion when said reinforcing member is mounted in said accommodation hole.

7. The reel unit for a spinning reel set forth in claim 1, wherein
   said accommodation hole opens at a plurality of positions on said rod attachment leg portion, at least one of the plurality of positions being on the rear side of said rod attachment leg portion; and
   said reinforcing member includes a plurality of reinforcing parts that are mounted in said accommodation hole from said plurality of openings.

8. The reel unit for a spinning reel set forth in claim 1, wherein
   said reinforcing member is detachably mounted in said accommodation hole.

9. The reel unit for a spinning reel set forth in claim 8, wherein
   said reel body further includes a body member, and a lid member that is coupled to said body member together with said reinforcing member.

10. The reel unit for a spinning reel set forth in claim 9, wherein
    said rod attachment leg portion is formed integrally with said body member.

11. The reel unit for a spinning reel set forth in claim 9, wherein
    said rod attachment leg portion is formed integrally with said lid member.

12. A spinning reel, comprising:
    a reel unit;
    a handle supported by said reel unit so as to be freely rotatable;
    a rotor supported on a front of said reel unit; and
    a spool disposed on a front of said rotor so as to be movable forward and backward,
    said rotor being for winding a fishing line around said spool;
    said reel unit including:
       a reel body;
       a T-shaped rod attachment leg portion which extends upward from said reel body, said rod attachment leg portion being formed integrally with a portion of said reel body, and having therein an accommodation hole having a slit-shaped opening that is open to an exterior at least on a rear side of said rod attachment lea portion and closed to exterior side surfaces of said rod attachment leg portion; and
       a reinforcing member that is coupled to said reel unit by being inserted in said accommodation hole through said opening.

13. The spinning reel set forth in claim 12, wherein
    said rod attachment leg portion is formed from a synthetic resin.

14. The spinning reel set forth in claim 12, wherein
    said reinforcing member is formed from a metal.

15. The spinning reel set forth in claim 12, wherein said reinforcing member is formed from a synthetic resin.

16. The spinning reel set forth in claim 15, wherein said accommodation hole also opens to a front side of said rod attachment leg portion.

17. The spinning reel set forth in claim 12, wherein a portion of said reinforcing member protrudes out from said rod attachment leg portion when said reinforcing member is mounted in said accommodation hole.

18. The spinning reel set forth in claim 12, wherein said accommodation hole opens at a plurality of positions on said rod attachment leg portion, at least one of the plurality of positions being on the rear side of said rod attachment leg portion; and said reinforcing member includes a plurality of reinforcing parts that are mounted in said accommodation hole from said plurality of openings.

19. The spinning reel set forth in claim 12, wherein said reinforcing member is detachably mounted in said accommodation hole.

20. The spinning reel set forth in claim 19, wherein said reel body further includes a body member, and a lid member that is coupled to said body member together with said reinforcing member, and said rod attachment leg portion is formed integrally with said body member.

* * * * *